July 15, 1969
F. J. POPELAR
3,455,457
LIQUID FILTERING SYSTEM FOR MACHINE COOLANT
Filed Nov. 22, 1965
2 Sheets-Sheet 1
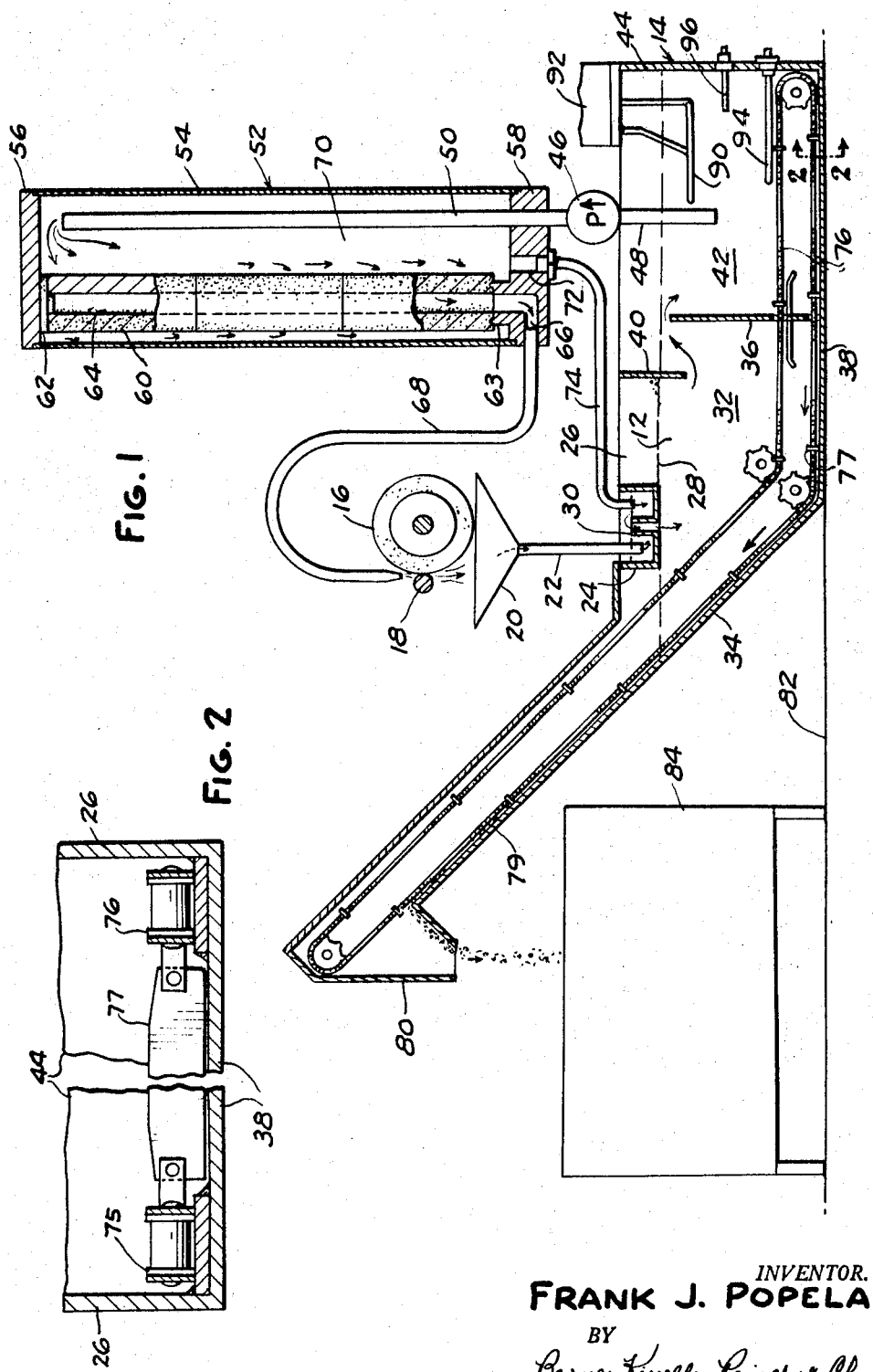
INVENTOR.
FRANK J. POPELAR
BY
*Barnes, Kisselle, Raisch & Choate*
ATTORNEYS July 15, 1969
F. J. POPELAR
3,455,457
LIQUID FILTERING SYSTEM FOR MACHINE COOLANT
Filed Nov. 22, 1965
2 Sheets-Sheet 2
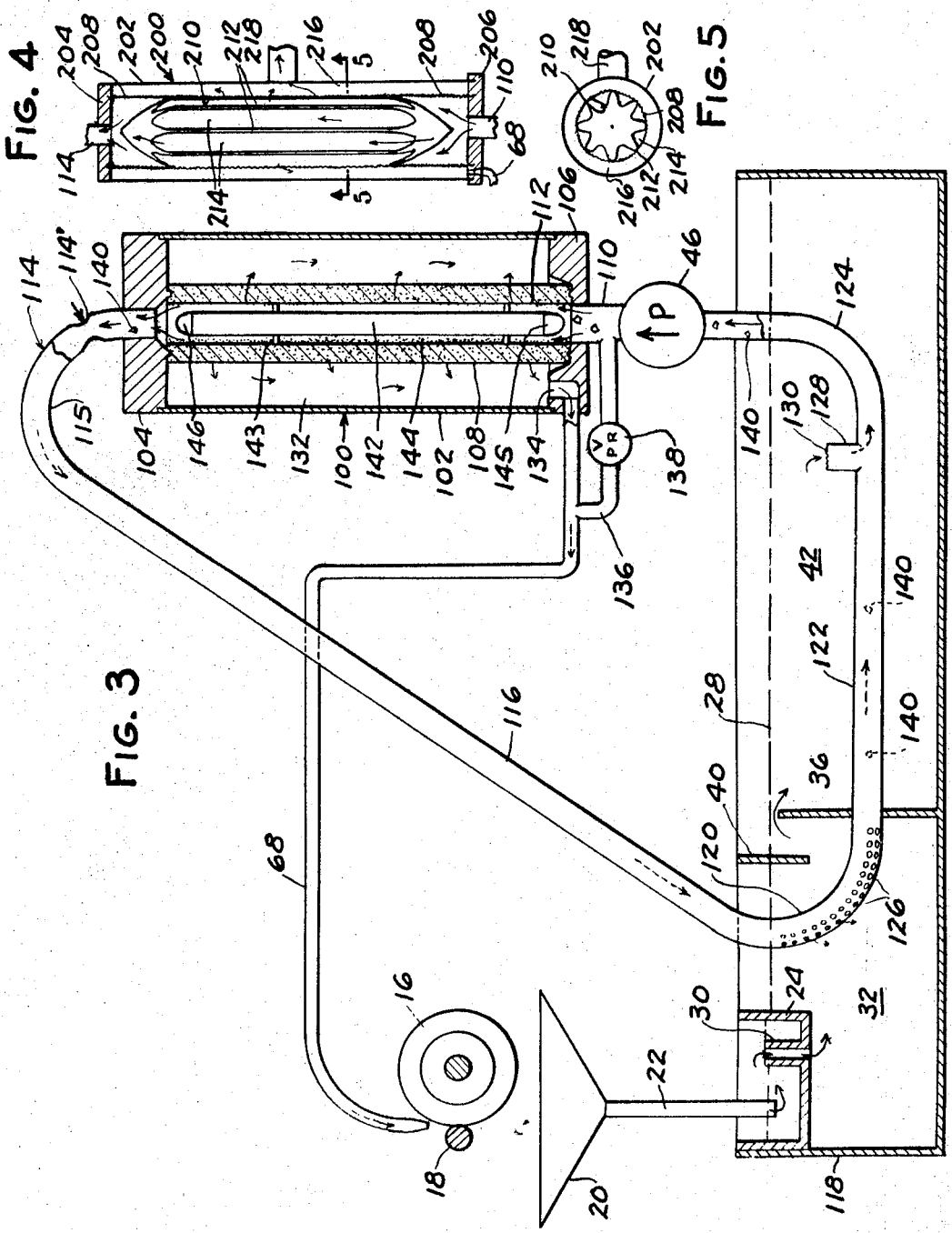
INVENTOR.
FRANK J. POPELAR
BY
Barnes, Kisselle, Raisch & Choate
ATTORNEYS

United States Patent Office 3,455,457
Patented July 15, 1969

3,455,457
LIQUID FILTERING SYSTEM FOR MACHINE COOLANT
Frank J. Popelar, 11505 Preston Road,
Britton, Mich. 49229
Filed Nov. 22, 1965, Ser. No. 509,118
Int. Cl. B01d 27/08, 27/00
U.S. Cl. 210—168      3 Claims

ABSTRACT OF THE DISCLOSURE

Liquid filtering apparatus in which contaminated liquid coolant from a machine tool is collected in a reservoir and continuously pumped therefrom through a filter unit containing first and second vertically extending chambers separated by a vertically extending filter media. The first chamber has a continuously open inlet and a continuously open outlet spaced vertically from one another, and the second chamber has a continuously open discharge conduit connected to the machine tool. The contaminated liquid coolant bows vertically from the inlet continuously along the filter surface, about one third of the contaminated coolant being continuously returned via the outlet directly to the reservoir so that the filter surface is continuously self-washed and the unit continuously flushed by the dirty coolant.

---

An object of the present invention is to provide a filtering system of the above character which is self-flushing and which will operate for an extended period of time without clogging or otherwise requiring a change or replacement of the filter media employed in the system.

Another object is to provide a filter system of the above character adapted to filter out of the contaminated coolant foreign particles of minute size, so that when operably connected to a grinder loading of the grinding wheel with foreign particles is eliminated, thereby enhancing the cutting efficiency of the wheel and reducing the amount of wheel dressing required.

A further object is to provide a liquid coolant filtering system which does not require that the coolant system be shut down for periodic emptying and cleaning, nor that the entire quantity of liquid coolant be replaced with fresh coolant, but rather wherein makeup coolant need be added only in a quantity sufficient to replace that lost at the work station.

Other objects, features and advantages of the present invention will become apparent from the following detailed description and accompanying drawings wherein:

FIG. 1 is a simplified, semi-schematic vertical elevation illustrating one embodiment of a filtering system and apparatus of the present invention, with portions thereof shown in vertical center section and other portions thereof being broken away to illustrate details.

FIG. 2 is a fragmentary vertical section taken on the line 2—2 of FIG. 1.

FIG. 3 is a simplified, semi-schematic vertical elevational view of another embodiment of a filtering system and apparatus of the present invention, the same being shown partially in vertical cross section.

FIG. 4 is a simplified vertical elevational view, shown partially in vertical cross section, of a modified filter unit of the invention.

FIG. 5 is a horizontal section taken on the line 5—5 of FIG. 4.

Referring in detail to FIG. 1, one exemplary embodiment of a liquid filtering and supply apparatus of the present invention is shown which is adapted to force feed the usual liquid coolant solution 12 such as water and a water-miscible cutting oil from a collecting tank 14 to a metal working machine to lubricate and cool the cutting tool, herein shown as the grinding wheel 16 of a grinding machine, as well as the work 18. Spent coolant along with the usual metal chips or other debris from the machine operation are collected in a chip pan 20, from which the contaminated coolant is drained by gravity via a return line 22 to a splash pan 24. Pan 24 is removably mounted on and extends between the opposite upright sidewalls 26 of tank 14 so as to be disposed generally above the liquid level 28. An upright overflow pipe 30 conducts the dirty coolant from pan 24 to the settling basin region 32 of tank 14. Region 32 extends from the upwardly and outwardly inclined end wall 34 of tank 14, which forms the left end of tank 14 as viewed in FIG. 1, to an upright weir 36 which extends from the tank bottom wall 38 upwardly to a point spaced slightly below liquid level 28. Disposed between pan 24 and weir 36 is a baffle 40 which extends horizontally between sidewalls 26 and vertically from above liquid level 28 downwardly to a point slightly below the elevation of the upper end of weir 36. Dirty coolant flows from region 32 under baffle 40 and then over weir 36 into the reservoir 42 of tank 14 defined by sidewalls 26, weir 36 and the upright end wall 44 at the right hand end of tank 14 as viewed in FIG. 1. A pump 46, which may be of a conventional submersible type, continuously withdraws the dirty coolant from reservoir 42 via an inlet pipe 48 and forces the same up in-flow tube 50 into the upper end of a filter unit 52.

Filter unit 52, as herein shown by way of example, consists of an outer cylindrical shell 54 closed at its top and bottom ends by plates 56 and 58 respectively to provide an upright pressure vessel which may be mounted directly above the open upper end of tank 14. A series of triple tier hollow cylindrical filter cartridges 60, only one of which is shown in FIG. 1, may be arranged upright in a circle around the axis of shell 54 with the cartridges suitably spaced from one another and from shell 54. Preferably cartridges 60 are each removably mounted in the filter unit between upper and lower pedestals 62 and 63 and may be replaced by removal of cover plate 56.

If desired, filter unit 52 may be a conventional commercially available water filter, such as Models P14 through P23 manufactured by The Cuno Engineering Corporation of Meriden, Conn., which are available for receiving replaceable filter cartridges mounted and arranged as described above. Cartridge 60 likewise may be a commercially available water filtering cartridge such as those sold under the trademarks Aqua-Pure #P110 or Micro-Klean by The Cuno Engineering Corporation, and which are made of cellulose fibers impregnated with resin with the fibers bonded in position by the resinous impregnation and polymerization. Such filters are available down to an initial degree of filtration as fine as five microns, the filter being capable of removing and retaining solid particles from liquid larger than the specified size. Stainless steel mesh cartridges are also commercially available with an initial degree of filtration rating of one micron, and these too may be employed in the filter unit of the invention.

The interior cavity 64 of each cartridge 60 communicates at its lower end with an outlet passage 66 which in turn is connected to the clean coolant supply line 68 which conducts the filtered coolant under pump pressure to the work station. A chamber 70 defined between the exterior of each cartridge 60 and shell 54 is also provided with an outlet 72 to which is connected a flush return line 74 which runs to pan 24. Outlet 72 is continuously maintained in open condition so long as liquid is being circulated in the system, and is disposed at the bottom of filter unit 52. The in-flow tube 50 preferably extends upwardly within shell 54 or is otherwise arranged so that the supply of dirty coolant from the pump is discharged from tube 50 into chamber 70 adjacent the upper end of the chamber. With this arrangement the pressure drop and liquid flow occurs downwardly parallel to the axis of shell 54 along the exterior surface of cartridges 60. A major portion of the liquid passes through the walls of cartridges 60 and is thereby filtered in passing to common outlet 66. The remainder exists from chamber 70 via outlet 72. Preferably outlets 66 and 72 are calibrated so that the volumetric flow rate in outlet 66 is approximately twice that in outlet 72. The dirty coolant is conducted by conduit 74 back to splash pan 24. The filtered coolant flows under pressure via conduit 68 to the work station where it is directed by a nozzle onto the grinding wheel 16 and work 18.

In accordance with a principal feature of the present invention, the contaminated coolant constantly flows axially along the exterior of cartridge 60, thereby continuously washing the same and preventing it from becoming clogged. Thus, instead of having to periodically shut down the unit to clean out the sludge in the bottom of the filter tank 52, the same is constantly drained of sludge and the filter cartridge 60 is likewise constantly subjected to a washing action along its exterior surface. As compared to prior art systems where all the dirty coolant is forced through a filter, the present system has been found to permit continued operation without changing filters for a greatly extended period of time.

If desired, a conventional drag conveyor may be provided in tank 14 which facilitates removal of the sludge as required from tank 14. As shown in FIGS. 1 and 2, the conveyor is of the endless type comprising a pair of spaced chains 75 and 76 trained around suitable sprockets and motor driven so that blades 77 carried by the chains scrape sludge deposits along bottom wall 38 and thence up end wall 34 into a chute 79 to an outlet 80 disposed at an elevation above liquid level 28, preferably at a convenient height above floor 82 to receive a sludge container 84 beneath chute 80.

Known thermostatically controlled heating and cooling equipment for maintaining a constant temperature of the liquid coolant supplied to the work 18 is preferably located in region 42 of tank 14. Such equipment may comprise a submerged cooling coil 90 connected to a refrigeration unit 92, a submerged heating element 94 and a thermostat including a submerged temperature sensing probe 96, all operably connected as is well understood in the art to maintain the desired coolant temperature.

The filtering system of the present invention may be modified with respect to several features as shown in simplified form in FIG. 3. The filter unit 100 in this modified system comprises a pressure vessel including a cylindrical casing 102 closed at the top and bottom ends thereof by plates 104 and 106 respectively. A filter cartridge 108, which may be identical to the previously described tiered cartridge 60, is mounted within shell 102 so as to extend axially thereof with its upper end sealably engaging plate 104 and its lower end likewise engaging plate 106. The outlet of pump 46 is connected by a conduit 110 to the axial bore 112 of the hollow cartridge, and the upper end of bore 112 communicates via plate 104 with the inlet of a return conduit 114 which may have an adjustable restriction 114' to control pressure in filter housing 102–106.

The inlet end 115 of conduit 114 is bent in a gradual curve to extend in a downwardly inclined run 116 into the settling region 32 of a collecting tank 118. Run 116 is connected through a gradual 120 degree bend 120 of the conduit to a horizontal run 122 of the conduit which extends through an aperture in baffle 36 and in turn is connected through another gradual bend 124 to the inlet of pump 46. The outer side of bend 120 has a series of perforations 126 disposed below the normal level 28 of liquid in tank 118 to thereby provide an outlet for discharging dirty coolant from conduit 114 into region 32.

Due to the approximately 120 degree curvature of bend 120, solid particles entrained in the fluid stream as it traverses bend 120 are acted upon by centrifugal force and tend to be expelled via perforations 126 into region 32 rather than carried onwardly into horizontal run 122. Run 122 communicates with region 42 via upright inlet tube 128, covered by a screen 130, into which coolant in region 42 is drawn by the suction effect of pump 46.

An annular chamber 132 is formed between the exterior of cartridge 108 and shell 102 which is connected via an outlet passage 134 in plate 106 to the supply conduit 68. In addition, a bypass conduit 136 controlled by a suitable pressure relief valve 138 connects the pump outlet 110 to the discharge conduit 68 to prevent buildup of excessive pressures in the system. The inlet of conduit 136 is suitably screened to prevent entry of scrubbing pieces 140 described hereinafter.

In the modified filter system as thus far described, dirty coolant is withdrawn from the reservoir 42 via inlet 128 and forced by pump 46 upwardly into cartridge bore 112 so as to flow upwardly therethrough along the inner surface of the cartridge. Most of this liquid coolant passes radially outwardly through the walls of cartridge 108, thereby being filtered as it passes to chamber 132. The clean filtered coolant is forced by pump pressure from chamber 132 via outlet 134 and conducted by supply line 68 to the work station where it is sprayed onto work 18 and tool 16 in the usual manner, and then returned in a contaminated condition via pan 20 and return line 22 to tank 118 as in the previous embodiment. Also, the outlet orifices are selected according to the various pressure drops in the system so that approximately two-thirds of the volumetric output of pump 46 is conducted by supply line 68 to the work station whereas the remaining one-third is conducted via conduit 114 in bypass relation to the work station back to the tank 118.

The embodiment of FIG. 3 is thus similar to the embodiment of FIG. 1 in that there is a continuous flow of dirty coolant along the surface of the filter exposed to the same. Hence there is a continuous washing action of this surface by the dirty coolant itself, thereby greatly extending the life of the filter and preventing premature clogging of the same from solid contaminants entrained in the coolant. However in this embodiment the washed surface comprises the internal rather than external surface of the cartridge. The flow of liquid coolant through the filter media is thus radially outwardly rather than inwardly so that the liquid migrates from the higher density, less porous inner region of the cartridge 108 to the less dense and more porous outer region of the cartridge, and thus in a direction opposite to that for which such cartridges are usually designed. Also, in the FIG. 3 embodiment the flow of dirty coolant through bore 112 is counter to the flow of coolant in chamber 132.

Another feature of the embodiment of FIG. 3 is the closed loop formed by conduit 114 and cartridge bore 112 which is adapted to contain a plurality of relatively indestructible solid scrubbing pieces 140, preferably comprising pyramidal shaped wedges of Teflon or other suitable material, which are small enough in size to be forced through pump 46 but too large in size to penetrate or lodge in the internal surface of cartridge 108 and also too large to pass through outlet holes 126 of bend 120 of conduit 114. Hence pieces 140 circulate continuously with the dirty coolant in the closed loop in bypass relation to the work station, the pieces tumbling upwardly along the interior surface of cartridge 108 as they are propelled by the dirty coolant stream and thereby scrubbing the same and thus enhancing the washing action of the dirty coolant stream.

Still another feature of the embodiment of FIG. 3 is the provision of an imperforate cylindrical core 142 mounted by struts 143 coaxially within bore 112 of cartridge 108 in spaced relation therewith to define an annular chamber 144 between core 142 and the wall of bore 112. Preferably the ends of core 142 are closed by rounded hemispherical caps 145 and 146 to impart a streamlined shape to the core. Core 142 serves as a restriction in the dirty coolant flow path, reducing the effective cross sectional area of bore 112 and thereby increasing the velocity of fluid flow in the dirty coolant loop as the same traverses the interior of the cartridge 108. This increased velocity further enhances the washing effect of the dirty coolant and thus further reduces the tendency of the filter to become clogged by solid contaminants.

FIGS. 4 and 5 illustrate another embodiment of a filter unit 200 also adapted for use in the filtering system of the present invention. Filter unit 200 comprises a tank formed by a cylindrical imperforate shell 202 closed at its upper and lower ends by cover plates 204 and 206 respectively. A cylindrical filter screen 208 is disposed concentrically within shell 202 and extends from plate 204 to plate 206. A flow restricting core 210 is disposed within filter screen 208 to increase the flow velocity along the interior surface of filter screen 208 in the manner of core 142 described previously. Core 210 preferably comprises a tubular sheet metal member which is radially corrugated (FIG. 5) to form axially extending ridges or ribs 212 which alternate circumferentially with intervening valleys 214. Screen 208 preferably comprises a fine mesh stainless steel screen which is wrapped around core 210 in taut relationship over ribs 212, these ribs thus serving as supports for the screen and also as points of attachment of the screen to the core as by means of soldering or brazing. The longitudinally extending valleys 214 thus define a series of flow passages for dirty coolant along the interior surface of screen 208. Coolant flowing radially outwardly from these passages through screen 208 enters the annular chamber 216 defined between screen 208 and shell 202, from which the filtered coolant is discharged via an outlet 218 connected to the supply line 68.

From the foregoing description it will now be apparent that the filter system and apparatus of the present invention is adapted to supply liquid coolant to a machine tool in a highly filtered state at a minimum cost in terms of equipment and operational expenses. By utilizing the unique principle of continuous circulation of a dirty coolant stream which is passed constantly along rather than through the filter media, e.g. through a chamber defined at least in part by a filter media and which is connected to a second chamber via the filter media, clean coolant may be tapped off as needed from the second chamber without prematurely loading the filter. Moreover, by so directing the dirty coolant continuously along rather than at the surface of the filter media, and by not forcing all of the coolant through the filter, a continuous washing action is obtained which reduces clogging of the filter to an extent surprisingly disproportionate to the volumetric flow through the filter media. These effects result in greatly reduced downtime for replacement of clogged filters, which costwise considerably more than makes up for the somewhat greater power consumption required to bypass approximately one-third of the coolant past the work station. In addition, due to the reduced clogging rate achieved in the system of the invention, pressure flow of the coolant delivered to the work station is maintained at a more uniform pressure over a longer period of time, thereby avoiding the continual pressure drop-off caused by filter clogging in prior art systems.

By combining the filter unit with the two stage reservoir tank as described herein, the coolant is withdrawn from the reservoir 42 into the pump in a semi-clean state, the coarser particles having been isolated in the upstream settling basin 32 by the provision of baffles 40 and 36 and chip pan 24.

The results obtained by apparatus constructed in accordance with the principles of the invention as disclosed herein have been quite surprising inasmuch as filter cartridges commercially available for use in drinking water filtering systems have been successfully employed in a much more severe environment, i.e. to filter a liquid coolant solution made up of oil and water containing carbon, grease, sludge, metal particles and various other debris commonly resulting from metal working machine tool operations. Although it is contemplated to provide accessory apparatus for removing sludge settling in tank 14 or 118 periodically or as required, this does not require downtime of the filtering system but rather can be done while the same is in operation as described in the embodiment of FIGS. 1 and 2. However, in certain lightly loaded installations of the filter system of the invention, the dirt may never actually settle out of the system but rather gradually increases in concentration in the dirty coolant loop over a period of several weeks of continuous operation. In such installations the entire system may be flushed and drained of dirty coolant and the same replaced with a clean batch of liquid coolant as required where this is more economical than providing a sludge removal apparatus such as the drag conveyor illustrated in FIGS. 1 and 2. The clean replacement coolant may be obtained by a recovery operation wherein most of the used system coolant is filtered and collected in a clean reservoir and allowed to stand for a sufficient period of time to settle out the contaminants.

What is claimed is:

1. A filter system for supplying liquid coolant to the material removing work station of a machine tool or the like comprising a reservoir for receiving the liquid coolant contaminated by material removed from the work, a filter unit comprising a closed tank disposed with its lengthwise dimension vertical and containing at least one hollow cartridge filter disposed upright within said tank in spaced relation to the interior surface of said tank and separating said tank into first and second vertically extending chambers, one of said chambers being defined by the space between the exterior surface of said filter and the interior surface of said tank and the other of said chambers being defined by the interior surface of said filter, said filter providing liquid communication between said chambers via said filter for filtering the contaminating material, said first chamber having a continuously open inlet near one end thereof and a continuously open outlet near an opposite end thereof spaced vertically from said inlet and located to cause contaminated liquid coolant to flow vertically through said first chamber along the one of said surfaces of said filter exposed to said first chamber, the flow guiding surface of said first chamber including said one surface of said filter being straight and vertical to define a substantially straight line vertical flow path extending directly between said inlet and outlet parallel to the flow guiding surface of said first chamber, means for circulating the contaminated liquid coolant from said reservoir to said first chamber via said inlet and under pressure through said first chamber in said flow path and back to said reservoir via said outlet in continuous bypass relation to the machine tool, a continuously open discharge conduit connected to said second chamber to conduct filtered coolant from said second chamber to the work station of the machine tool and a return conduit connected to conduct the contaminated liquid coolant from the work sation of the machine tool to said reservoir, said inlet, said outlet and said discharge conduit being calibrated relative to one another such that the volumetric flow rate in said discharge conduit is about twice that in said outlet whereby said one surface of said filter is continuously self-washed by the contaminated liquid coolant so that said filter unit is continuously self-flushing while supplying filtered coolant to the machine tool, said tank and said cartridge filter being both cylindrical and disposed with their axes parallel, said first chamber comprising the hollow interior of said filter and said one surface comprising the interior surface of said filter, said inlet and outlet being respectively connected to the bottom and top ends of said filter, and wherein said second chamber comprises the space between the exterior surface of said filter and the interior surface of said tank, said discharge conduit being connected to the bottom end of said second chamber whereby the contaminated pressurized coolant flows upwardly through said first chamber along said interior surface of said filter and the filtered coolant flows downwardly in said second chamber along the exterior surface of said filter to said discharge conduit.

2. The combination set forth in claim 1 wherein said cartridge filter comprises an imperforate tubular core having radial corrugations in its outer surface defining axially extending smoothly curved ridges and valleys alternating circumferentially around said core, and a filter screen wrapped around said core and extending axially therealong, said screen contacting the smoothly curved peaks of said ridges and extending circumferentially from peak to peak to thereby define with said corrugations axial flow passages which together comprise at least a major portion of said first chamber.

3. A filter system for supplying liquid coolant to the material removing work station of a machine tool or the like comprising a reservoir for receiving the liquid coolant contaminated by material removed from the work, a filter unit comprising a closed tank disposed with its lengthwise dimension vertical and containing at least one hollow cartridge filter disposed upright within said tank in spaced relation to the interior surface of said tank and separating said tank into first and second vertically extending chambers, one of said chambers being defined by the space between the exterior surface of said filter and the interior surface of said tank and the other of said chambers being defined by the interior surface of said filter, said filter providing liquid communication between said chambers via said filter for filtering the contaminating material, said first chamber having a continuously open inlet near one end thereof and a continuously open outlet near an opposite end thereof spaced vertically from said inlet and located to cause contaminated liquid coolant to flow vertically through said first chamber along the one of said surfaces of said filter exposed to said first chamber, the flow guiding surface of said first chamber including said one surface of said filter being straight and vertical to define a substantially straight line vertical flow path extending directly between said inlet and outlet parallel to the flow guiding surface of said first chamber, means for circulating the contaminated liquid coolant from said reservoir to said first chamber via said inlet and under pressure through said first chamber in said flow path and back to said reservoir via said outlet in continuous bypass relation to the machine tool, a continuously open discharge conduit connected to said second chamber to conduct filtered coolant from said second chamber to the work station of the machine tool and a return conduit connected to conduct the contaminated liquid coolant from the work station of the machine tool to said reservoir, said inlet, said outlet and said discharge conduit being calibrated relative to one another such that the volumetric flow rate in said discharge conduit is about twice that in said outlet whereby said one surface of said filter is continuously self-washed by the contaminated liquid coolant so that said filter unit is continuously self-flushing while supplying filtered coolant to the machine tool, said circulating means comprising a closed loop including said first chamber and a conduit serially communicating with said inlet and said outlet, said loop containing a plurality of solid scrubbing particles entrained in the contaminated coolant and of a size not passable by said filter but flowable continuously through said loop for scrubbing said one surface of said filter, said conduit having a return run extending from said outlet to said inlet of said first chamber with a portion of said return run extending in said reservoir in submerged relation to the body of contaminated liquid coolant therein, said submerged portion of said run having a perforated portion retaining said particles in said loop while permitting return flow of contaminated coolant from said loop to said reservoir, said return run having an intake for admitting coolant from said reservoir into said loop and located downstream of said perforated portion.

References Cited
UNITED STATES PATENTS

| | | | |
|---|---|---|---|
| 651,423 | 6/1900 | Miner | 210—433 X |
| 2,407,303 | 9/1946 | Teale | 210—433 X |
| 2,559,614 | 7/1951 | Hapman | 210—526 X |
| 2,999,597 | 9/1961 | Harms | 210—526 X |
| 3,272,650 | 9/1966 | MacVittle | 134—7 |

FOREIGN PATENTS 665,429   5/1929   France.

OTHER REFERENCES

Bird, B. Stewart, W., Lightfoot, E., Transport Phenomena, John Wiley & Sons (1960).

REUBEN FRIEDMAN, Primary Examiner

T. A. GRANGER, Assistant Examiner

U.S. Cl. X.R.

210—262, 298, 353, 434, 443, 446, 526